United States Patent
Araki et al.

(10) Patent No.: US 12,286,024 B2
(45) Date of Patent: Apr. 29, 2025

(54) CHARGING SYSTEM

(71) Applicant: HONDA MOTOR CO., LTD., Tokyo (JP)

(72) Inventors: Jun Araki, Saitama (JP); Atsushi Nakajima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 409 days.

(21) Appl. No.: 17/766,110

(22) PCT Filed: Oct. 6, 2020

(86) PCT No.: PCT/JP2020/037854
§ 371 (c)(1),
(2) Date: Apr. 1, 2022

(87) PCT Pub. No.: WO2021/070815
PCT Pub. Date: Apr. 15, 2021

(65) Prior Publication Data
US 2022/0348099 A1    Nov. 3, 2022

(30) Foreign Application Priority Data
Oct. 7, 2019   (JP) .................................. 2019-184710

(51) Int. Cl.
*H02M 1/15* (2006.01)
*B60L 53/56* (2019.01)
(Continued)

(52) U.S. Cl.
CPC .......... *B60L 53/56* (2019.02); *H02J 7/00712* (2020.01); *H02J 7/143* (2020.01); *H02J 15/007* (2020.01); *H02M 1/15* (2013.01)

(58) Field of Classification Search
None
See application file for complete search history.

(56) References Cited

U.S. PATENT DOCUMENTS

| 10,011,178 | B1 * | 7/2018 | Xu | ........................ H02M 1/15 |
| 2010/0019723 | A1 * | 1/2010 | Ichikawa | ............... B60L 50/16 320/109 |

(Continued)

FOREIGN PATENT DOCUMENTS

| DE | 10 2009 055 845 A1 | 6/2011 |
| JP | S61-043735 U | 3/1986 |

(Continued)

OTHER PUBLICATIONS

Nov. 10, 2020, International Search Report issued for related PCT Application No. PCT/JP2020/037854.

(Continued)

*Primary Examiner* — Arun C Williams
(74) *Attorney, Agent, or Firm* — Paratus Law Group, PLLC

(57) ABSTRACT

A charging system which charges a power storage device mounted on a moving object, includes: an electric power conversion device that converts electric power supplied from a commercial power supply; a kinetic energy storage device that stores kinetic energy; and a rotary electric machine that is electrically connected to the electric power conversion device and is mechanically connected to the kinetic energy storage device.

14 Claims, 17 Drawing Sheets

(51) Int. Cl.
*H02J 7/00* (2006.01)
*H02J 7/14* (2006.01)
*H02J 15/00* (2006.01)

(56) References Cited

U.S. PATENT DOCUMENTS

| | | | |
|---|---|---|---|
| 2010/0019734 A1* | 1/2010 | Oyobe | B60K 6/445 320/162 |
| 2011/0101915 A1* | 5/2011 | Mitsutani | B60L 53/305 320/109 |
| 2012/0026771 A1 | 2/2012 | Imura et al. | |
| 2013/0106350 A1* | 5/2013 | Ono | H01M 10/44 320/109 |
| 2014/0312839 A1* | 10/2014 | Uyeki | B60L 53/64 320/109 |
| 2016/0114693 A1 | 4/2016 | Tsuno | |
| 2017/0072807 A1 | 3/2017 | Matsumoto et al. | |
| 2020/0164755 A1* | 5/2020 | Smolenaers | B60L 53/53 |

FOREIGN PATENT DOCUMENTS

| | | |
|---|---|---|
| JP | 2012-070468 A | 4/2012 |
| JP | 2016-086582 A | 5/2016 |
| WO | WO 2015/159560 A1 | 10/2015 |
| WO | WO 2018/078625 A2 | 5/2018 |

OTHER PUBLICATIONS

Nov. 10, 2020, International Search Opinion issued for related PCT Application No. PCT/JP2020/037854.
Dec. 19, 2022, European Search Report issued for related EP Application No. 20874842.6.
Nov. 9, 2023, European Communication issued for related EP Application No. 20874842.6.
Oct. 29, 2024, Translation of Japanese Office Action issued for related JP Application No. 2021-551662.

* cited by examiner

TIME t [sec.]

TIME t [sec.]

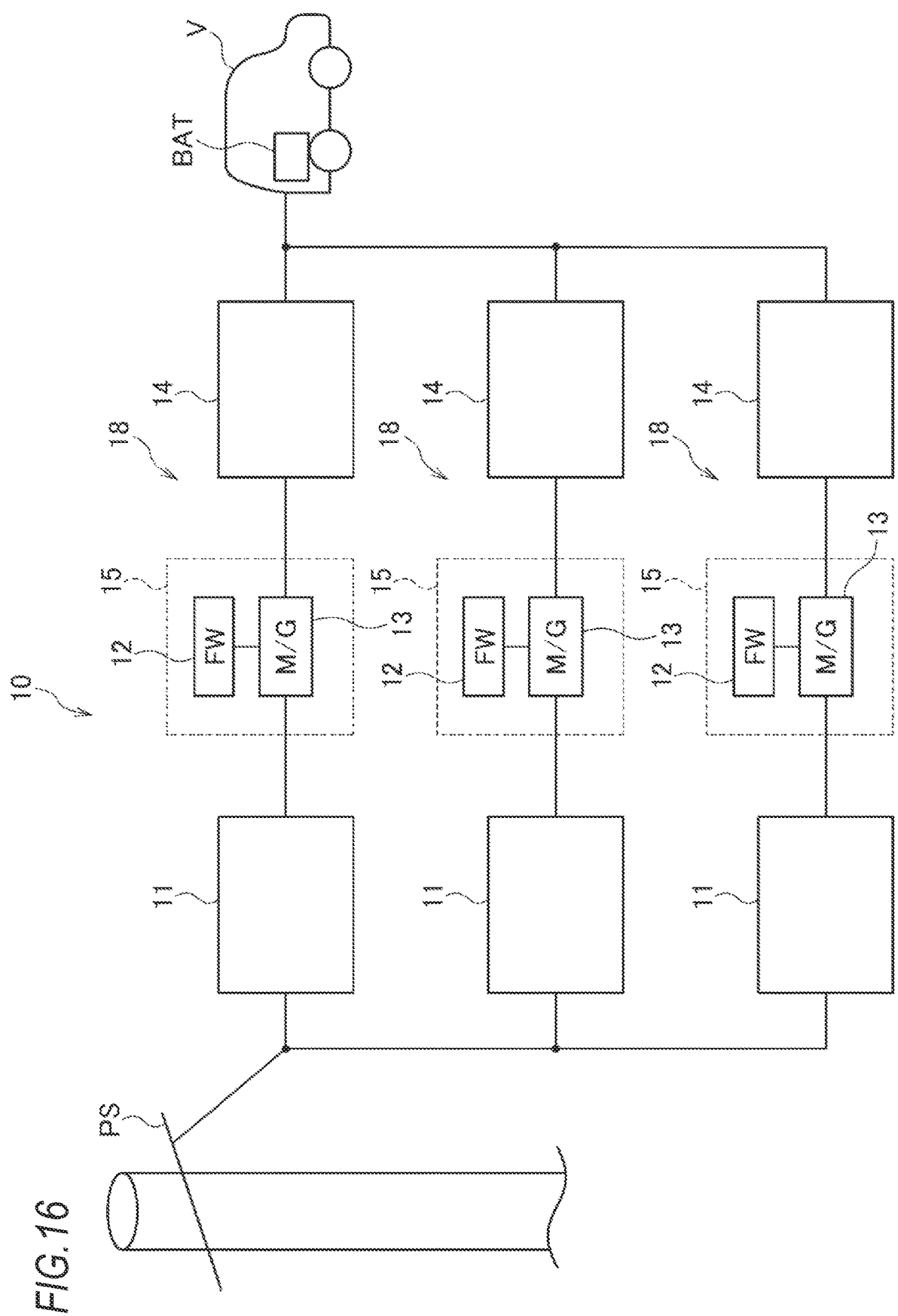

CHARGING SYSTEM

CROSS REFERENCE TO PRIOR APPLICATION

This application is a National Stage Patent Application of PCT International Patent Application No. PCT/JP2020/037854 (filed on Oct. 6, 2020) under 35 U.S.C. § 371, which claims priority to Japanese Patent Application No. 2019-184710 (filed on Oct. 7, 2019), which are all hereby incorporated by reference in their entirety.

TECHNICAL FIELD

The present invention relates to a charging system for charging a power storage device mounted on a moving object.

BACKGROUND ART

In recent years, electric vehicles equipped with a large-capacity battery have been developed. Although such an electric vehicle has a long cruising range, it has a problem that it takes a long time to charge. Therefore, development on quick charging is underway.

When high-voltage power (for example, 6,600V) is drawn from a commercial power source in order to implement quick charging, a high-voltage power receiving facility (cubicle) is required, which is a heavy burden in terms of size and cost. Moreover, when it is attempted to store energy equivalent to that of an existing gas station with electric power, a required site becomes very large, which is not realistic.

Therefore, Patent literature 1 proposes to use a flywheel as an energy storage device to store kinetic energy instead of electrical energy.

CITATION LIST

Patent Literature

Patent Literature 1: JP1986-43735U1

SUMMARY OF INVENTION

Technical Problem

However, there is room for improvement when trying to use the one described in Patent Literature 1 commercially.

The present invention provides a charging system capable of efficiently charging in a limited space.

Solution to Problem

According to an aspect of the present invention, there is provided a charging system which charges a power storage device mounted on a moving object, includes: an electric power conversion device that converts electric power supplied from a commercial power supply; a kinetic energy storage device that stores kinetic energy; and a rotary electric machine that is electrically connected to the electric power conversion device and is mechanically connected to the kinetic energy storage device.

Advantageous Effects of Invention

According to the present invention, by storing the electric power supplied from the commercial power supply as kinetic energy in the kinetic energy storage device, it is possible to store energy appropriately in a limited space as compared with the case of storing electrical energy, and the power storage device mounted on the moving object can be efficiently charged.

BRIEF DESCRIPTION OF DRAWINGS

FIG. 16 is a functional block diagram of a charging system according to a fourth embodiment of the present invention.

DESCRIPTION OF EMBODIMENTS

Hereinafter, embodiments of a charging system of the present invention will be described with reference to the drawings.

First Embodiment

Figure 1:
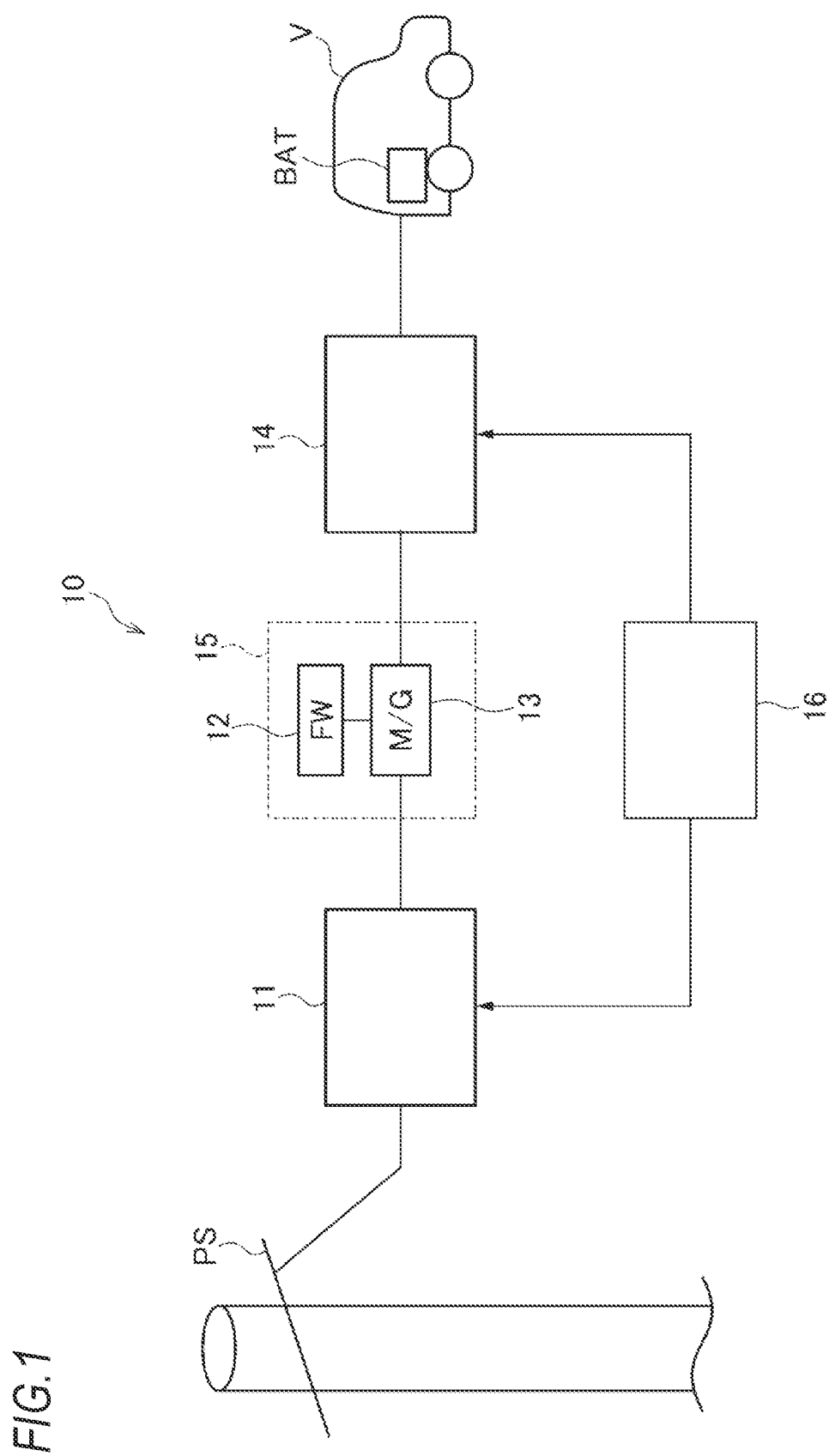
FIG. 1 is a functional block diagram of a charging system according to a first embodiment of the present invention.

As illustrated in FIG. 1, a charging system 10 is a charging system that charges a battery BAT mounted on a vehicle V, which is a moving object. The vehicle V may be a vehicle equipped with the battery BAT and is, for example, a hybrid vehicle, a plug-in hybrid vehicle, an electric vehicle, or a fuel cell vehicle.

The charging system 10 includes an inverter 11 that converts electric power supplied from a commercial power supply PS, a flywheel 12 that stores kinetic energy, a motor generator 13 that is electrically connected to the inverter 11 and is mechanically connected to the flywheel 12, a quick charger 14 that is electrically connected to the motor generator 13 and supplies electric power to the battery BAT of the vehicle V, and a control device 16 that controls the inverter 11 and the quick charger 14. The flywheel 12 and the motor generator 13 form a kinetic energy storage unit 15.

A voltage of the electric power supplied from the commercial power supply PS (hereinafter, referred to as "introduced electric power") is preferably an AC voltage of 100 V or more and 500 V or less and is, for example, a three-phase three-wire AC 200 V When the voltage of the introduced electric power is high, a dedicated power receiving facility such as a high-voltage power receiving facility (cubicle) is required, but when the voltage of the introduced electric power is low, a special power receiving facility such as a high-voltage power receiving facility (cubicle) is not required. In addition, when the voltage of the introduced electric power is low; a large site for installing a high-voltage power receiving facility (cubicle) is not required, and thus an introduction cost can be suppressed. When the site has a margin, a high-voltage power receiving facility (cubicle) capable of receiving an AC voltage of 6,600 V and receiving an electric power of 100 kW to 500 kW may be installed.

Figure 2:
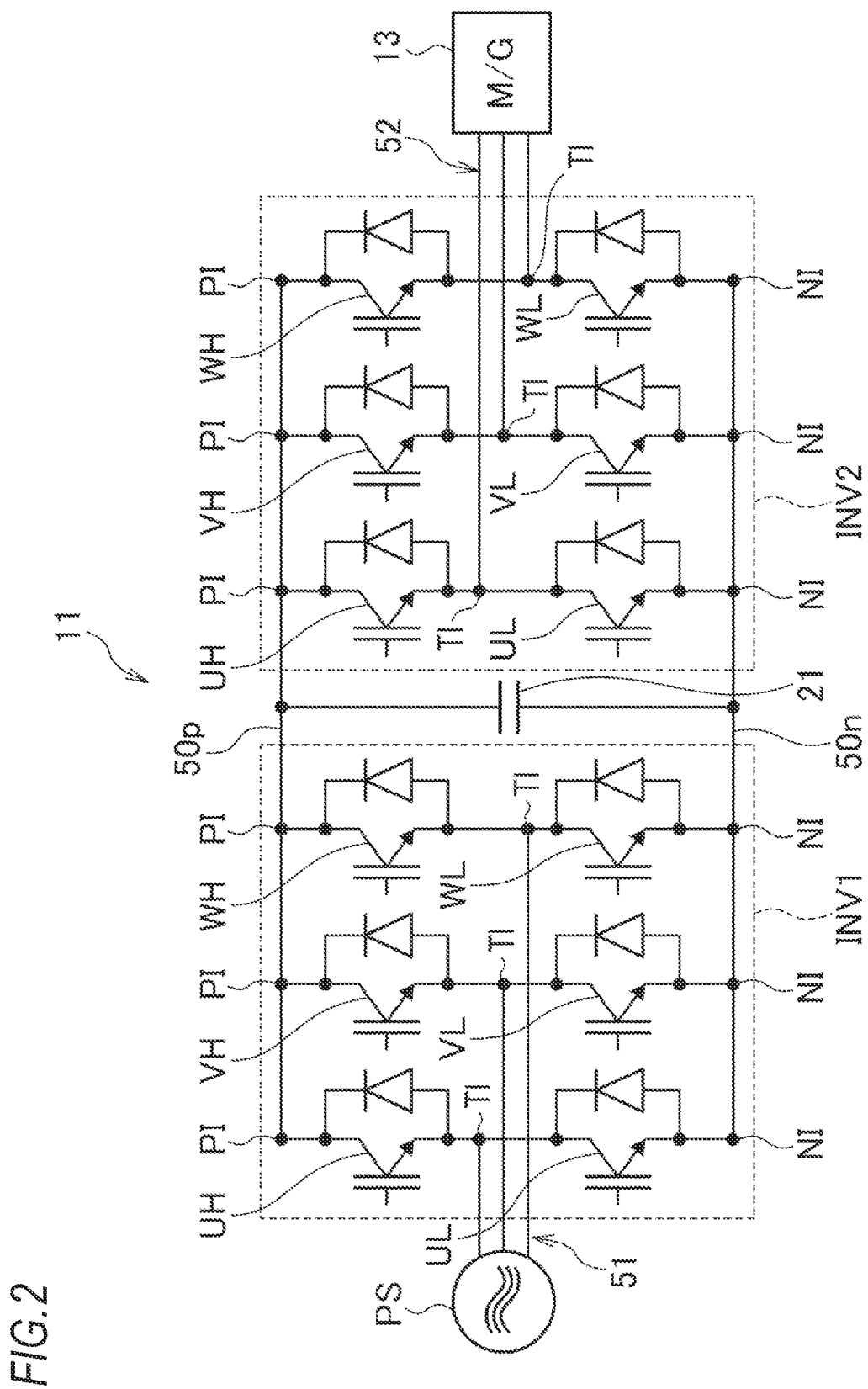
FIG. 2 is an electric circuit diagram of a first power conversion device of FIG. 1.

As illustrated in FIG. 2, the inverter 11 includes a first inverter unit INV1 which converts the three-phase AC power (hereinafter, sometimes referred to as a first three-phase AC power), which is the introduced electric power, into DC power and a second inverter unit INV2 which converts the DC power converted by the first inverter unit INV1 into a three-phase AC power (hereinafter, sometimes referred to as a second three-phase AC power) different from the first three-phase AC power, which is suitable for driving the motor generator 13. The first inverter unit INV1 and the second inverter unit INV2 have the same structure and are connected in series to each other with a first smoothing capacitor 21 interposed therebetween.

Each of the first inverter unit INV1 and the second inverter unit INV2 includes a bridge circuit formed of a plurality of bridge-connected switching elements. For example, the switching element is a transistor such as an Insulated Gate Bipolar Transistor (IGBT) or a Metal Oxide Semi-conductor Field Effect Transistor (MOSFET). For example, in the bridge circuit, paired high-side arm and low-side arm U-phase transistors UH and UL, paired high-side arm and low-side arm V-phase transistors VH and VL, and paired high-side arm and low-side arm W-phase transistors VH and VL are respectively bridge-connected.

Respective transistors UH, VH, and WH of the high side arm have collectors connected to positive electrode terminals PI to form a high side arm. In each phase, each positive electrode terminal PI of the high side arm is connected to a positive electrode connection line 50p. Respective transistors UL, VL, and WL of the low side arm have emitters connected to negative electrode terminals NI to form a low side arm. In each phase, each negative electrode terminal NI of the low side arm is connected to a negative electrode connection line 50n.

In each phase, the emitters of respective transistors UH, VH, and WH of the high side arm are connected to the collectors of respective transistors UL, VL, and WL of the low side arm at connection points TI.

In each phase of the first inverter unit INV1, the connection point TI is connected to the commercial power supply PS by a first connection line 51. In each phase of the second inverter unit INV2, the connection point TI is connected to the motor generator 13 by a second connection line 52.

The bridge circuit includes a diode connected between the collector and the emitter of respective transistors UH, UL, VH, WH, and WL so as to be in a forward direction from the emitter to the collector.

Each of the first inverter unit INV1 and the second inverter unit INV2 switches ON (conduction) and OFF (disconnection) of each phase transistor pair based on a gate signal which is a switching command input to a gate of each of the transistors UH, VH, WH. UL. VL, and WL. The first inverter unit INV1 converts the first three-phase AC power input from the commercial power supply PS into DC power, and the second inverter unit INV2 converts the DC power input from the first inverter unit INV1 into the second three-phase AC power.

The first smoothing capacitor 21 smoothes voltage fluctuation generated by an ON and OFF switching operation of each of the transistors UH, UL, VH, VL, WH, and WL of each of the first inverter unit INV1 and the second inverter unit INV2.

The motor generator 13 is a three-phase AC type motor generator. During energy filling, the flywheel 12 is rotated by power running drive using the electric power input from the inverter 11. Further, during battery charging, kinetic energy of the flywheel 12 is converted into electric energy by regenerative drive and electric power is supplied to the quick charger 14.

Figure 3:
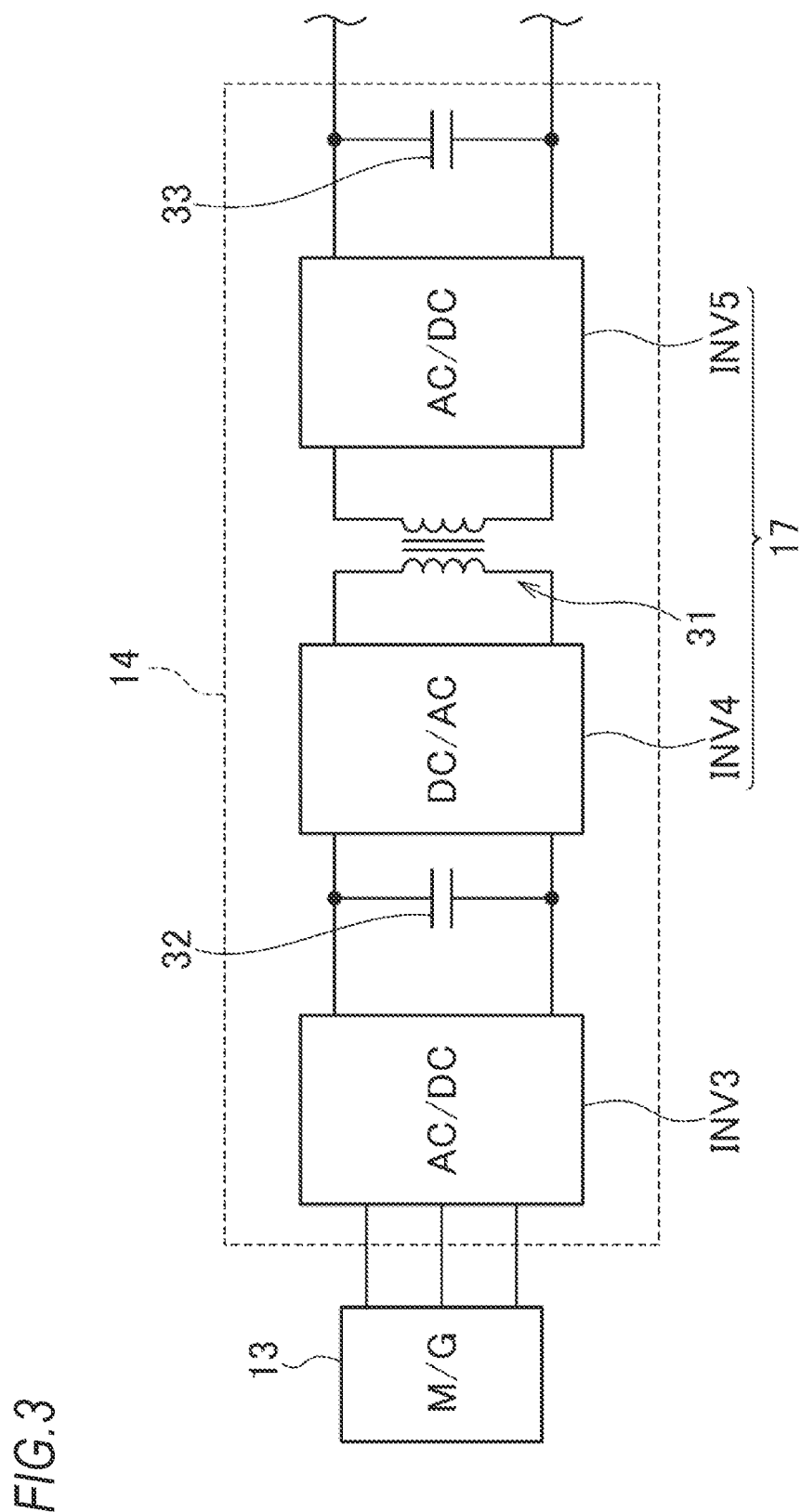
FIG. 3 is an electric circuit diagram of a second power conversion device of FIG. 1.

As illustrated in FIG. 3, the quick charger 14 includes a third inverter unit INV3 which converts the three-phase AC power generated by the motor generator 13 into DC power, a fourth inverter unit INV4 which converts the DC power converted by the third inverter unit INV3 into single-phase AC power, a high-frequency transformer 31 which transforms the single-phase AC power input from the fourth inverter unit INV4, and a fifth inverter unit INV5 which converts the single-phase AC power input from the high-frequency transformer 31 into DC power. A second smoothing capacitor 32 is provided between the third inverter unit INV3 and the fourth inverter unit INV4 and a third smoothing capacitor 33 is provided on a downstream side of the fifth inverter unit INV5. The fourth inverter unit INV4, the high frequency transformer 31, and the fifth inverter unit INV5 form a boost converter 17 which boosts the electric power supplied from the motor generator 13 during battery charging, By controlling the switching of the first inverter unit INV1 and the second inverter unit INV2 of the inverter 11 and controlling the switching of the third inverter unit INV3, the fourth inverter unit INV4, and the fifth inverter unit INV5 of the quick charger 14, the control device 16 performs energy filling of the flywheel 12 and performs charging of the battery BAT mounted on the vehicle V.

Figure 4:
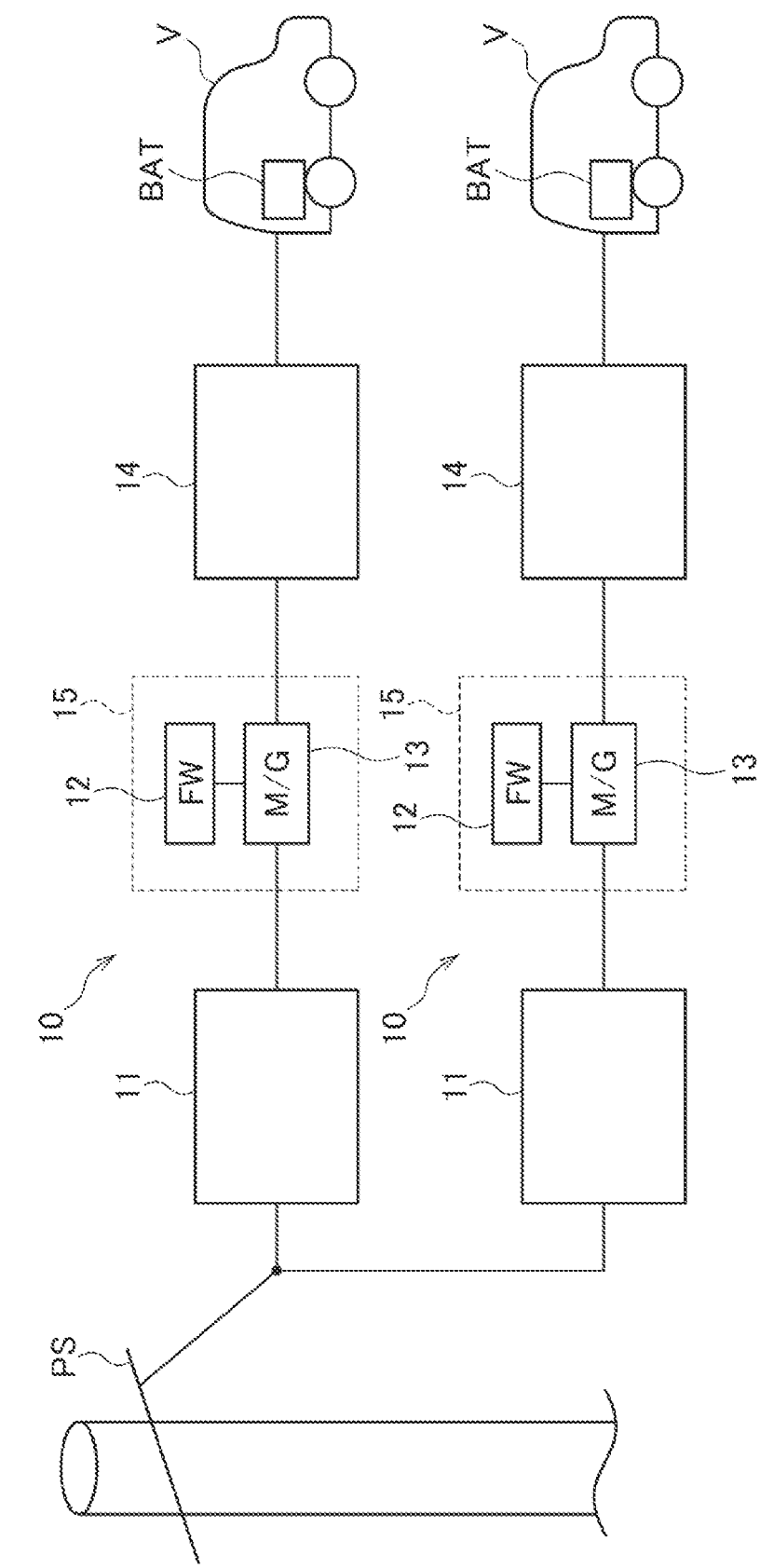
FIG. 4 is a functional block diagram of a charging station provided with a plurality of charging systems of FIG. 1.

The charging system 10 configured in such a way can be installed in a car dealer, a convenience store, a supermarket, or the like. The flywheel 12 stores kinetic energy until the flywheel 12 is fully filled by power running driving the motor generator 13 which receives the electric power supplied from the commercial power supply PS via the inverter 11. The charging system 10 having the flywheel 12 in a fully filled state can be recognized by a user (driver) of the vehicle V through a mobile terminal such as a car navigation system or a smartphone. As illustrated in FIG. 4, one charging station may be provided with two charging systems 10 or three or more charging systems 10. When the vehicle V needs to be charged, the user can charge the battery BAT mounted on the vehicle V by stopping at one of the nearby charging systems 10 in the fully filled states. As a result, it is possible to shorten or eliminate the waiting time.

Each charging system 10 may be capable of supplying the energy required to charge the battery BAT for one vehicle. Here, it is assumed that the vehicle V is an electric vehicle having a cruising range of 500 km. In order to secure the cruising range of 500 km, the electric energy amount of the battery BAT needs to be about 50 kWh. When it is assumed that the output of the quick charger 14 is 3 MW, charging of the electric vehicle can be achieved in about one minute as similar to that of an existing gasoline vehicle until the charging is completed. When the output of the inverter 11 is about 50 kW, it may be sufficient to have a space of 0.5 $m^3$ as an installation space of the inverter 11. Also, when the energy storage capacity of the flywheel 12 is 50 kWh, it may be sufficient to have a space of 1.4 $m^3$ as an installation space of the flywheel 12. Further, when the output of the quick charger 14 is 3 MW, it may be sufficient to have a space of 3 $m^3$ as an installation space of the quick charger 14. When the output of the inverter 11 is 50 kW, the flywheel 12 having an energy storage capacity of 50 kWh can be fully filled in about sixty minutes.

Figure 5:
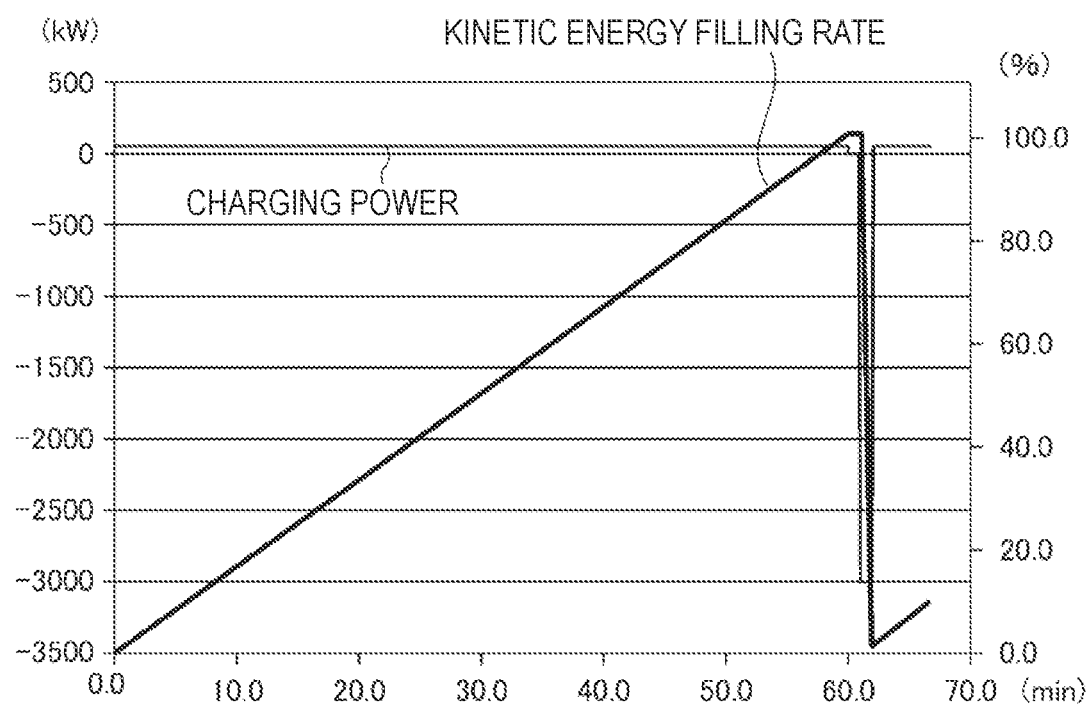
FIG. 5 is a graph illustrating changes in charging power and kinetic energy filling rate of a flywheel with respect to time in the charging system of FIG. 1.

FIG. 5 is a graph illustrating changes in the charging power (kW: left vertical axis) of the quick charger 14 and the kinetic energy filling rate (%: right vertical axis) of the flywheel 12 with respect to time (min: horizontal axis) when it is assumed that the voltage of the introduced electric power is AC 200 V, the output of the inverter 11 is 50 kW, the output of the quick charger 14 is 3 MW, and the energy storage capacity of the flywheel 12 is 50 kWh.

According to HG. 5, since the introduced electric power is a low voltage, it takes a predetermined time to fully fill the flywheel 12 with the kinetic energy, but the charging is completed in an extremely short time. Therefore, the user can charge the vehicle V in the similar time as that of an existing gasoline vehicle. It is not preferable to completely stop the flywheel 12 during charging, and for example, it is preferable to complete charging when the kinetic energy filling rate reaches 3% to 5%.

As described above, according to the charging system 10 of the present embodiment, since a relatively small space is sufficient for installation, the degree of freedom of installation is high and many charging stations can be provided to users.

Second Embodiment

Figure 6:
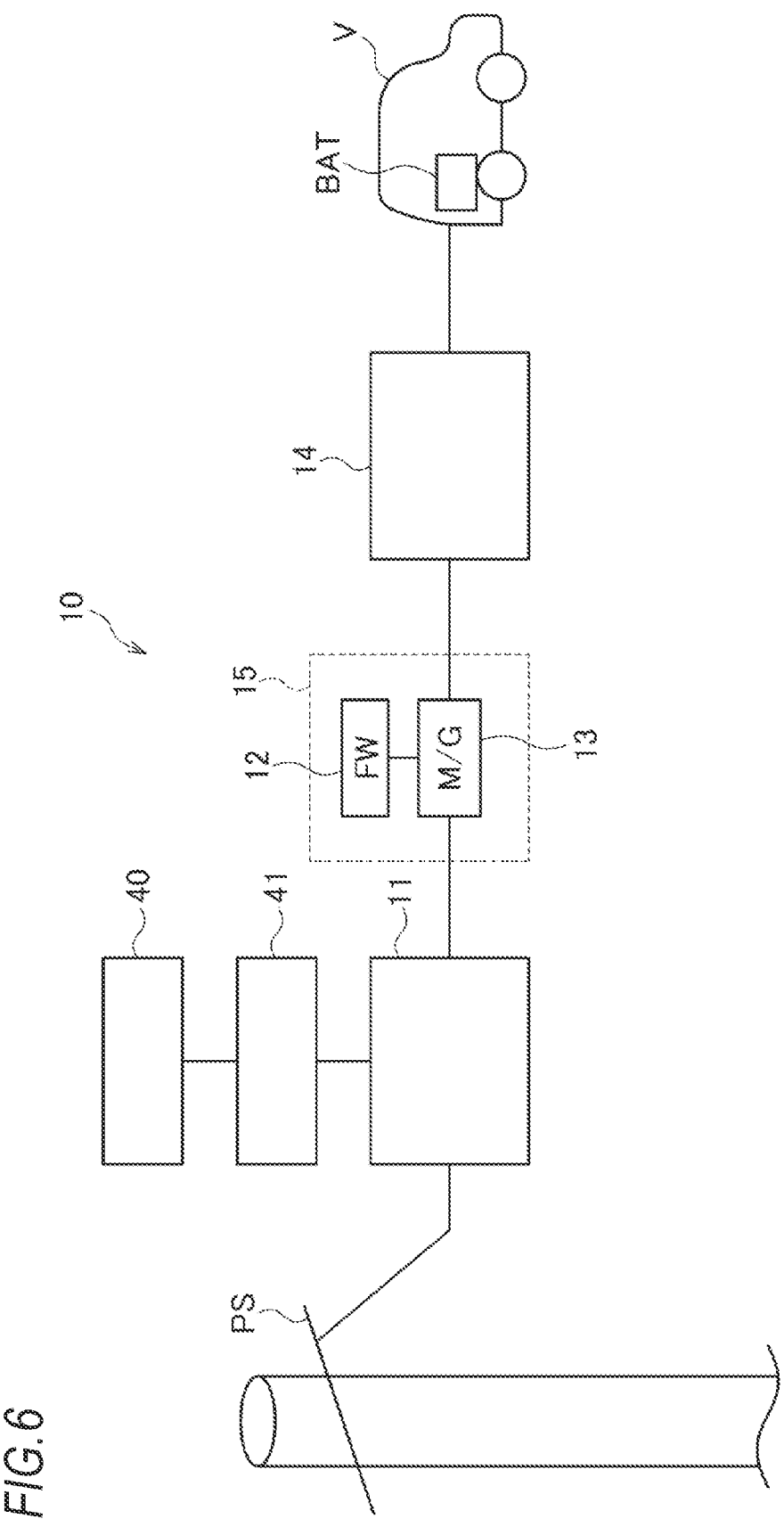
FIG. 6 is a functional block diagram of a charging system according to a second embodiment of the present invention.

Next, a charging system 10 of a second embodiment of the present invention will described with reference to FIG. 6.

In the charging system 10 of the second embodiment, a solar cell 40 is electrically connected to the inverter 11 as an auxiliary power source in the charging system 10 of the first embodiment. In the present embodiment and other embodiments described below, the same configuration as that of the charging system 10 of the first embodiment is designated by the same reference numerals and letters and the description thereof will be omitted.

Figure 7A:
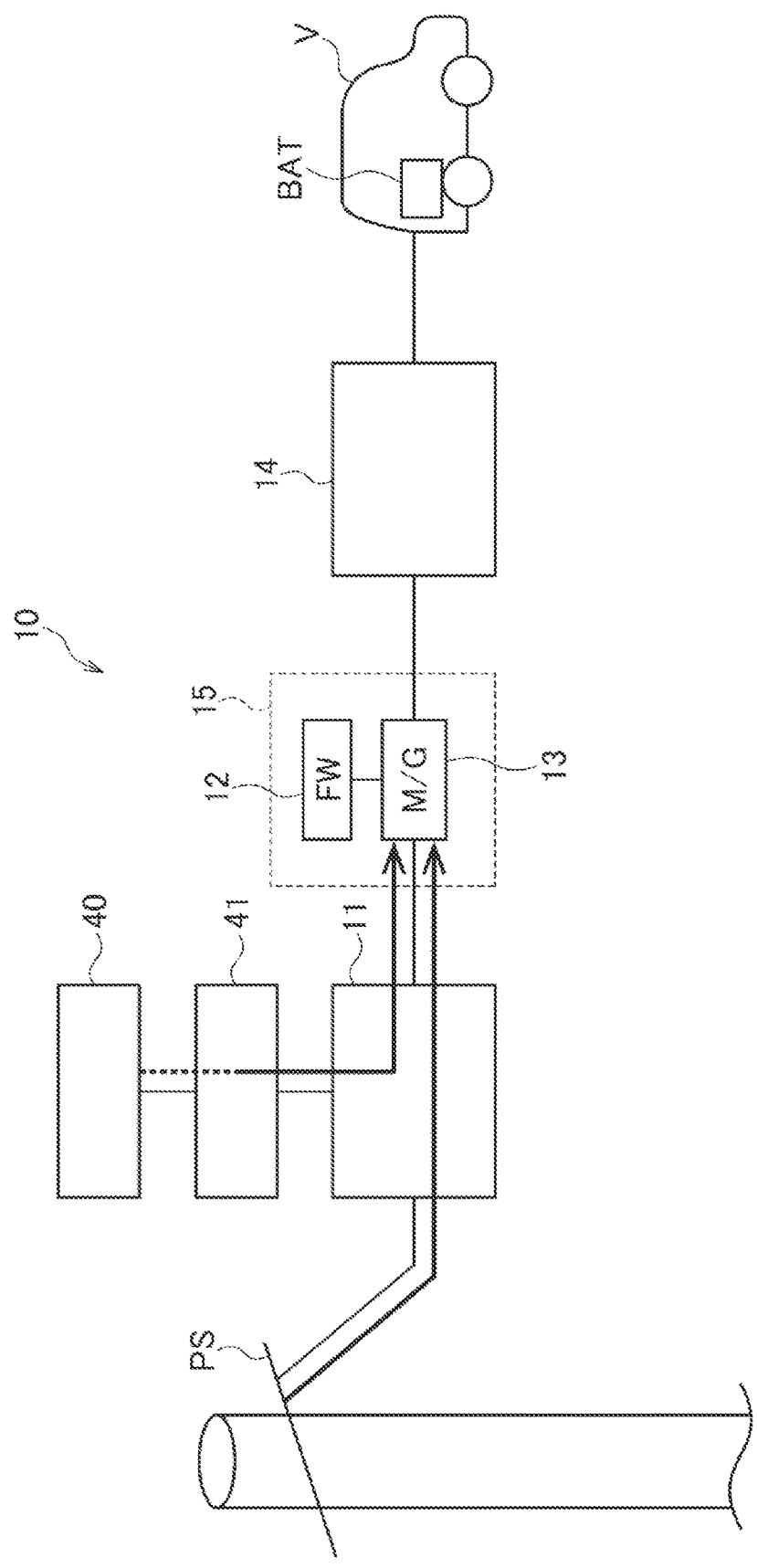
FIG. 7A is a diagram illustrating an electric flow when a kinetic energy filling rate of a flywheel is less than full filling in the charging system of FIG. 6.
Figure 7B:
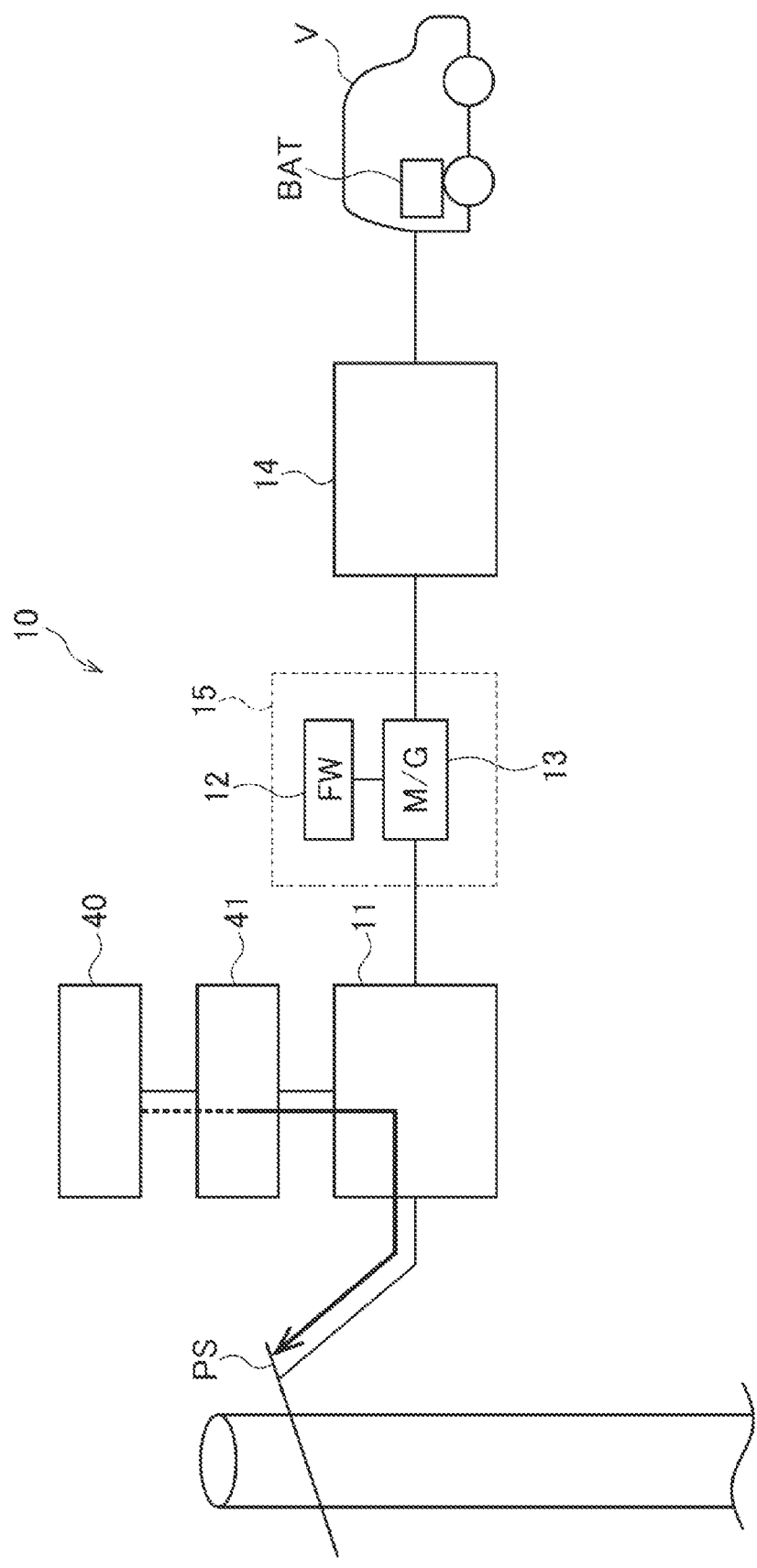
FIG. 7B is a diagram illustrating an electric flow when the kinetic energy filling rate of the flywheel is fully filled in the charging system of FIG. 6.

The charging system 10 of the present embodiment is configured such that the solar cell 40 is electrically connected to the inverter 11 as an auxiliary power source via an auxiliary power source inverter 41 and the electric power generated by the solar cell 40 can be used as needed. The auxiliary power source inverter 41 converts the DC power generated by the solar cell 40 into three-phase AC power. In FIGS. 7A and 7B, the solid arrow indicates AC power and the dotted arrow indicates DC power (the same applies to FIG. 9).

Specifically, when the flywheel 12 is not fully filled, as illustrated in FIG. 7A, in addition to the electric power supplied from the commercial power supply PS, the electric power generated by the solar cell 40 is supplied to the motor generator 13 via the inverter 11, and then the motor generator 13 which receives these electric powers is driven by power running to store kinetic energy in the flywheel 12 until the flywheel 12 is fully filled. On the other hand, when the flywheel 12 is fully filled, as illustrated in FIG. 7B, the electric power generated by the solar cell 40 can be sold via a power supply path of the commercial power supply PS, As a result, the natural energy can be effectively utilized and the economic burden on an operator of the charging system 10 can be reduced. The auxiliary power source is not limited to the solar cell 40, but may be wind power generation, geothermal power generation, wave power generation, or the like.

Third Embodiment

Figure 8:
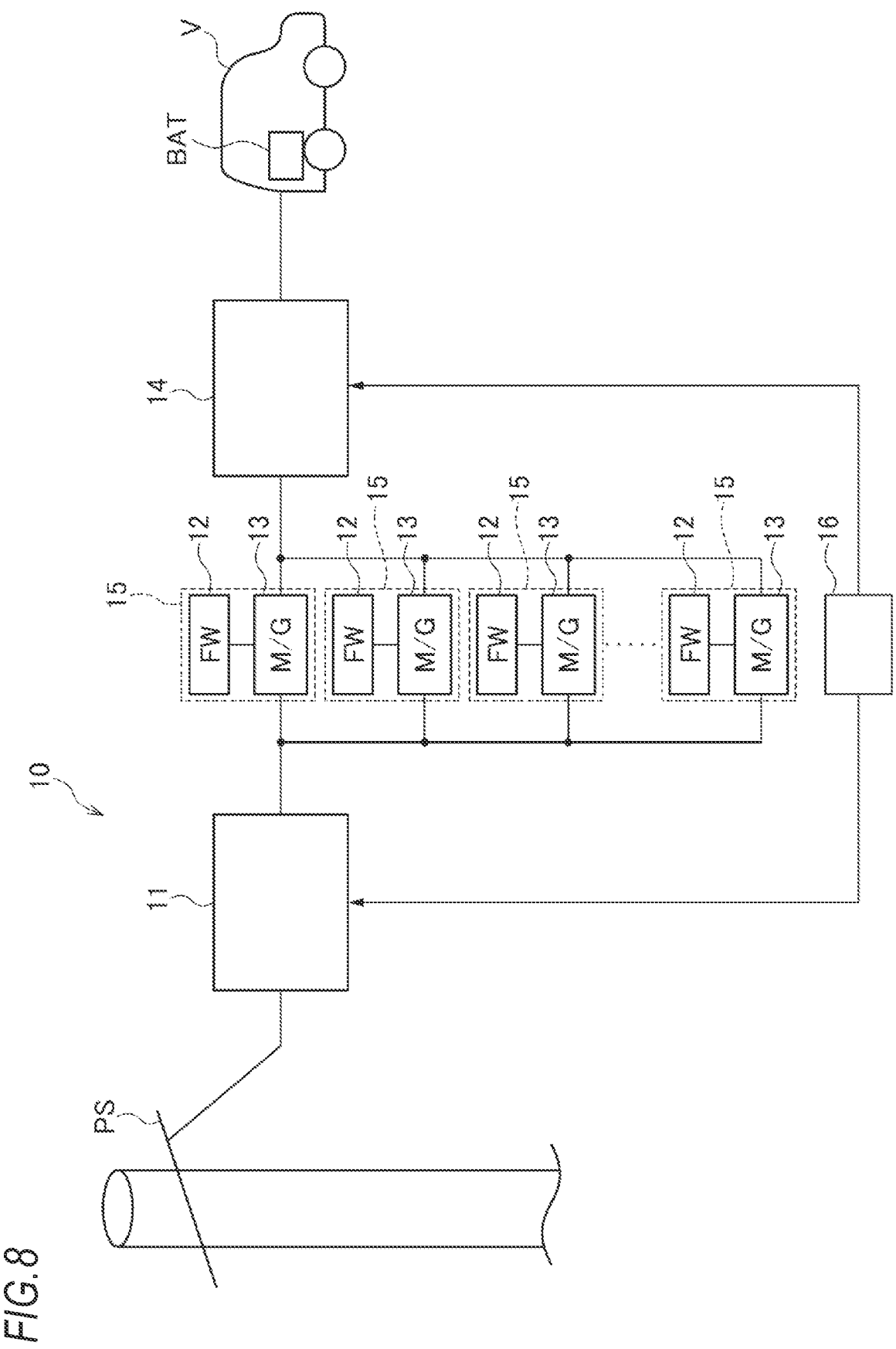
FIG. 8 is a functional block diagram of a charging system according to a third embodiment of the present invention.

Next, a charging system 10 of a third embodiment of the present invention will be described with reference to FIG. 8. In the charging system 10 of the first embodiment, one kinetic energy storage unit 15 composed of the flywheel 12 and the motor generator 13 is provided. However, in the charging system 10 of the third embodiment, a plurality of kinetic energy storage units 15 are provided between the inverter 11 and the quick charger 14.

Figure 9A:
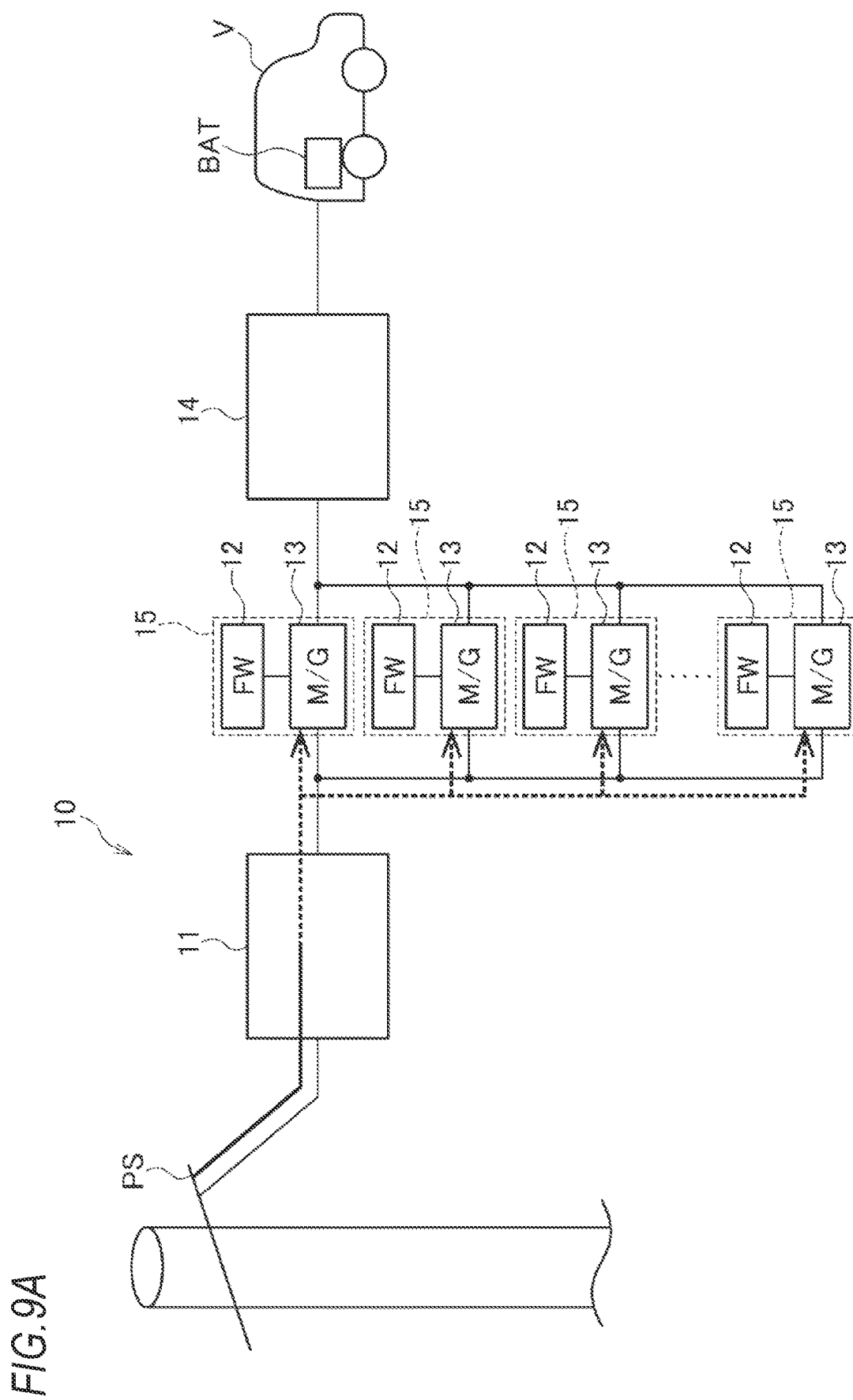
FIG. 9A is a diagram illustrating an electric flow during phase matching control in the charging system of FIG. 8.

More specifically, in the charging system 10 of the present embodiment, a plurality of (for example, eight) motor generators 13 are electrically connected each other, and electrically connected in parallel between the inverter 11 and the quick charger 14. Each motor generator 13 forms the kinetic energy storage unit 15 and the flywheel 12 is connected to each motor generator 13. When driving the plurality of motor generators 13 with one inverter 11, it is necessary to match phases of all the motor generators 13. Therefore, before driving all the motor generators 13, as illustrated in FIG. 9A, a phase matching control in which direct current is passed through all the motor generators 13 for a predetermined time is performed in advance. By the phase matching control, all the motor generators 13 can be drawn to any position, and as a result, the phases of all the motor generators 13 can be matched.

Figure 10:
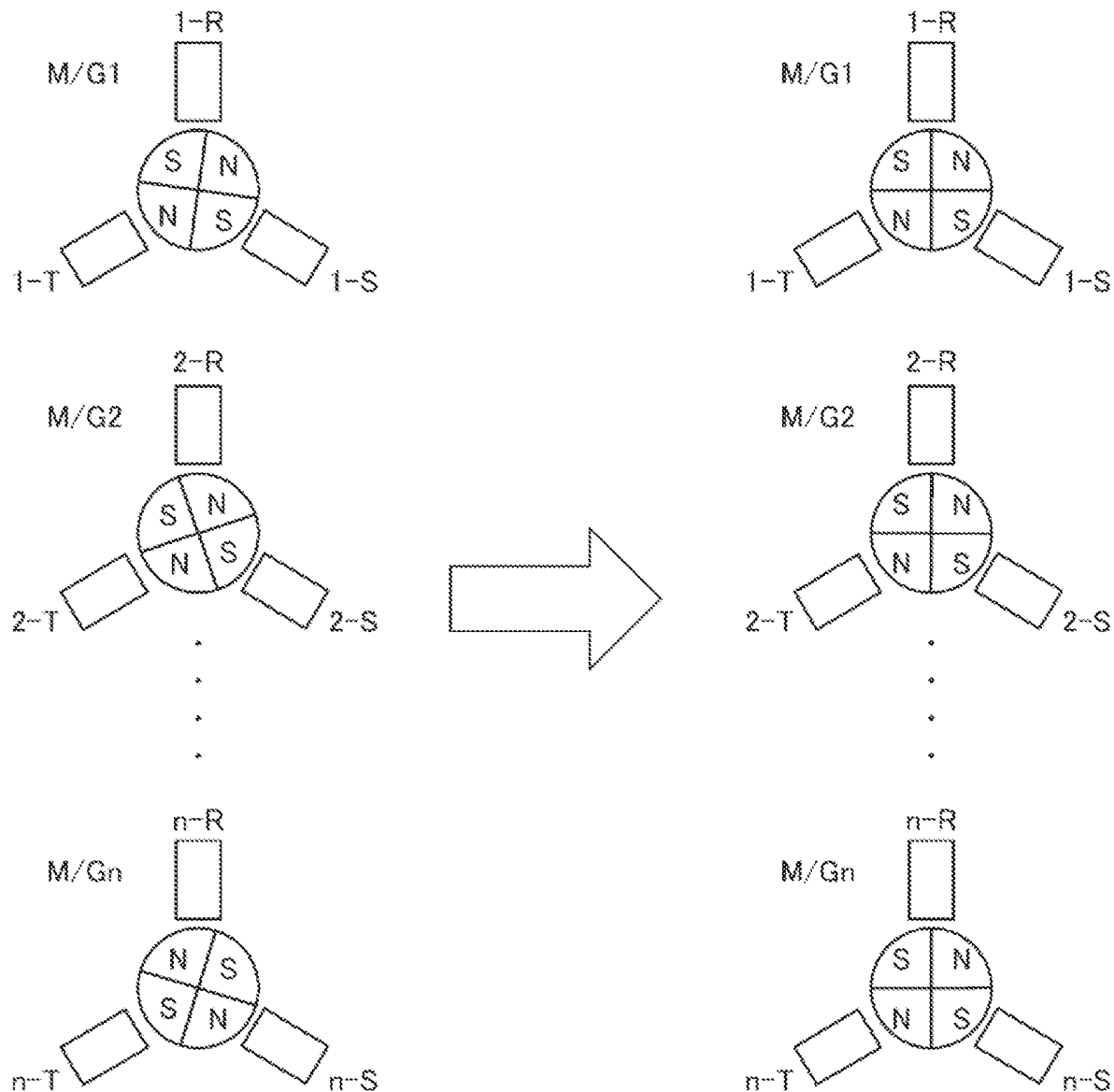
FIG. 10 is a diagram illustrating phases of a plurality of motor generators before and after the phase matching control of FIG. 8.
Figure 11:
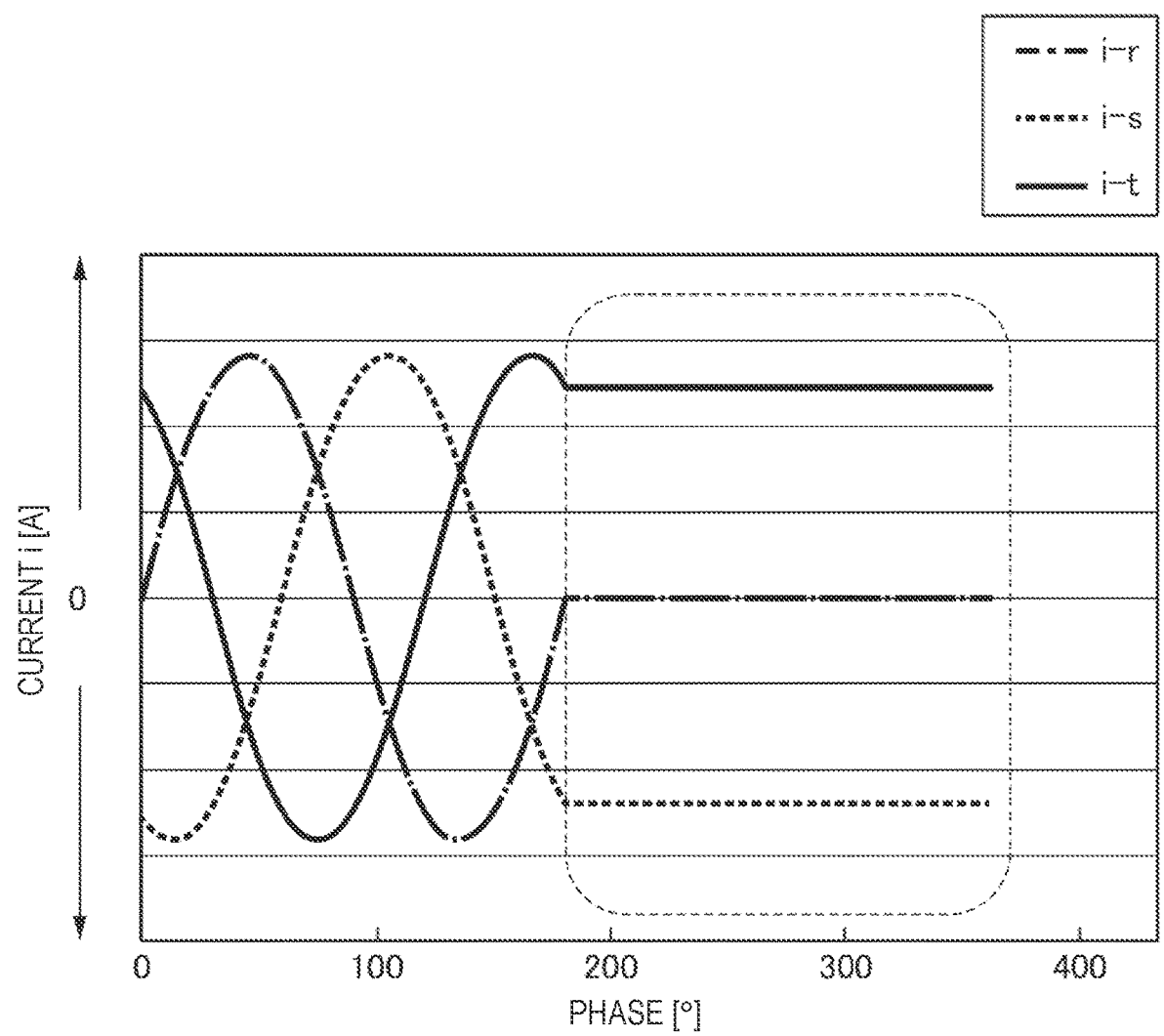
FIG. 11 is a graph illustrating an energizing method of the phase matching control of FIG. 8.
Figure 12:
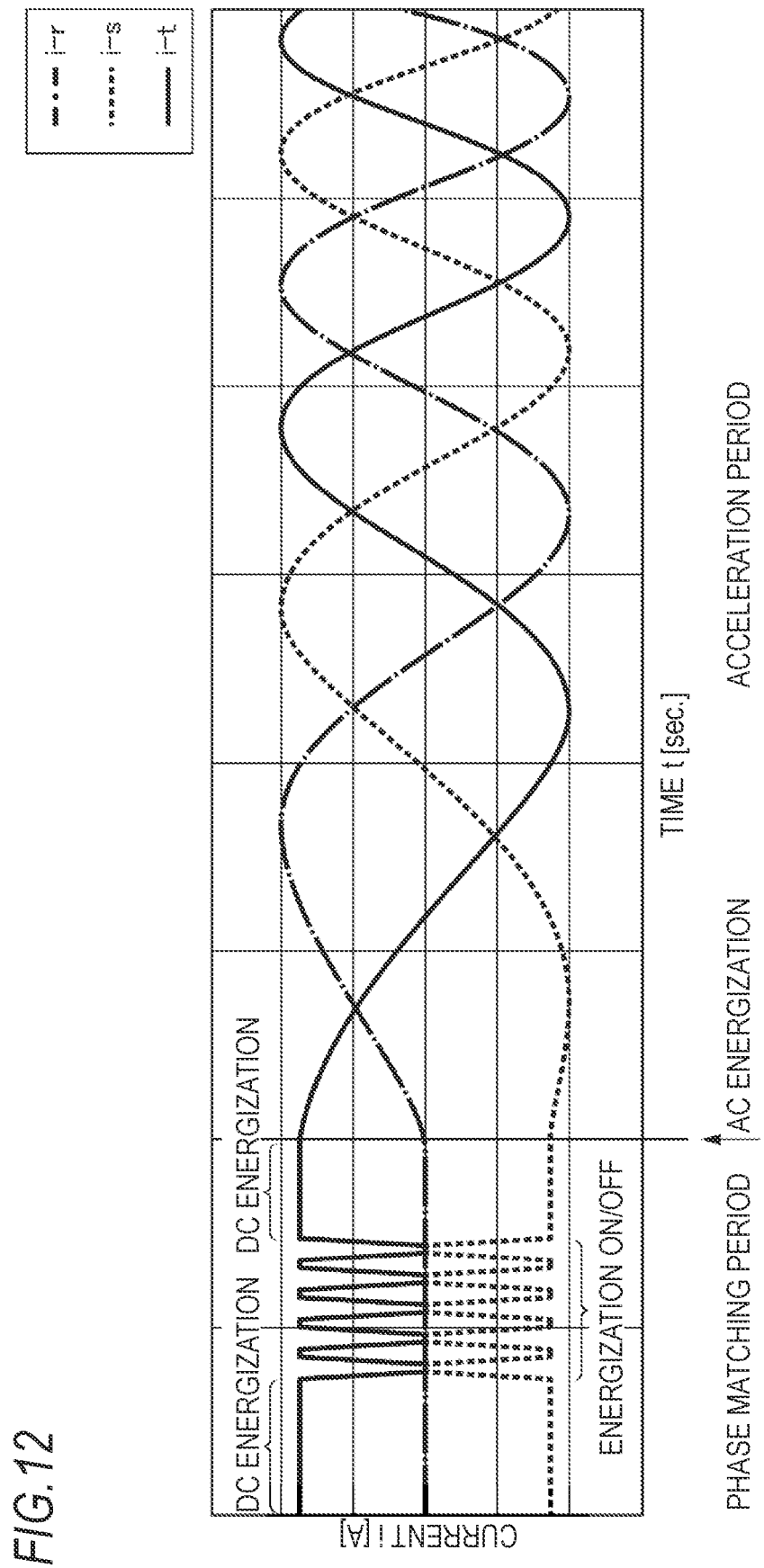
FIG. 12 is a graph for more specifically illustrating the energizing method of FIG. 11.

Here, the phase matching control will be described more specifically with reference to FIGS. 10 to 12, FIGS. 10 to 12 illustrate a case where n (n is an integer of one or more) motor generators 13 are electrically connected each other, and electrically connected to the inverter 11 in parallel. M/Gn is an n-th motor generator 13. Also, n-R is an R-phase coil of the n-th motor generator 13, n-S is an S-phase coil of the n-th motor generator 13, and n-T is a T-phase coil of the n-th motor generator 13, In FIGS. 10 to 12, the three phases of the three-phase AC power are the R phase, the S phase, and the T phase, which are synonymous with the U phase, the V phase, and the W phase in FIG. 2.

As illustrated on the left side of FIG. 10, when the rotor phases of the motor generators 13 (M/G1, M/G2, ... M/Gn) are different, even when the alternating current output from the inverter 11 is energized as it is, rotors of respective motor generators 13 (M/G1, M/G2, ... M/Gn) do not rotate appropriately. Therefore, as illustrated in FIG. 11, an instantaneous value (in the example of FIG. 11, the value at the zero phase of the R phase current) of the three-phase alternating current is applied to the S phase and the T phase with direct current. In this case, as illustrated in FIG. 12, it is preferable to intermittently execute DC energization by repeating energization (ON) and stop (OFF) for a predetermined period. By intermittently applying torque to at least a part of the phases in such a way, a gentle reaction force acts on the rotor when the torque is released, and thus the phase matching operation of the rotor is promoted. Phase matching control is not limited to the case where DC energization is executed for the remaining two phases of the three phases when any one of the three phases is zero phase and DC energization may be executed for all three phases.

Figure 9B:
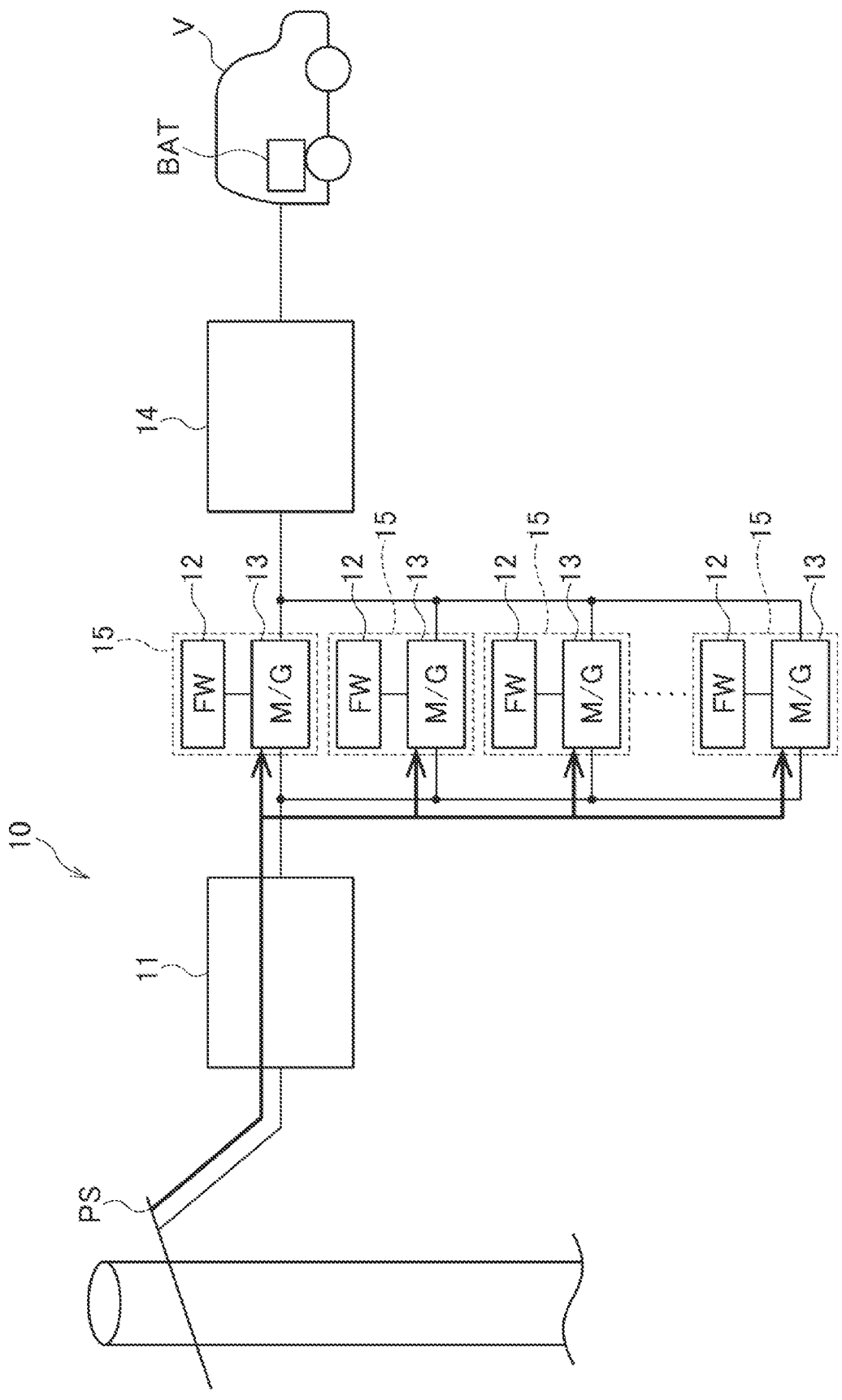
FIG. 9B is a diagram illustrating an electric flow when a kinetic energy filling rate of a flywheel is less than full filling in the charging system of FIG. 8.

After the phase matching operation illustrated on the right side of FIG. 10 is completed, as illustrated in FIGS. 9B and 12, all the flywheels 12 can be filled with kinetic energy by supplying AC power to all the motor generators 13.

When a plurality of motor generators 13 are electrically connected each other and electrically connecter to the quick charger 14 in parallel, the inductance of the boost converter 17 during charging changes depending on the number of motor generators 13. When the number n of the motor generators 13 increases, the effective current value becomes n times and the inductance becomes 1/n, so that the peak value of the ripple current becomes n times. Therefore, since the current peak is the sum of the effective current value and the peak value of the ripple current (hereinafter, simply referred to as the ripple current), the current peak becomes n times as the number n of the motor generators 13 increases. When the current peak becomes large, it is necessary to use a component having a high withstand voltage, which leads to an increase in cost of the boost converter 17.

Figure 15:
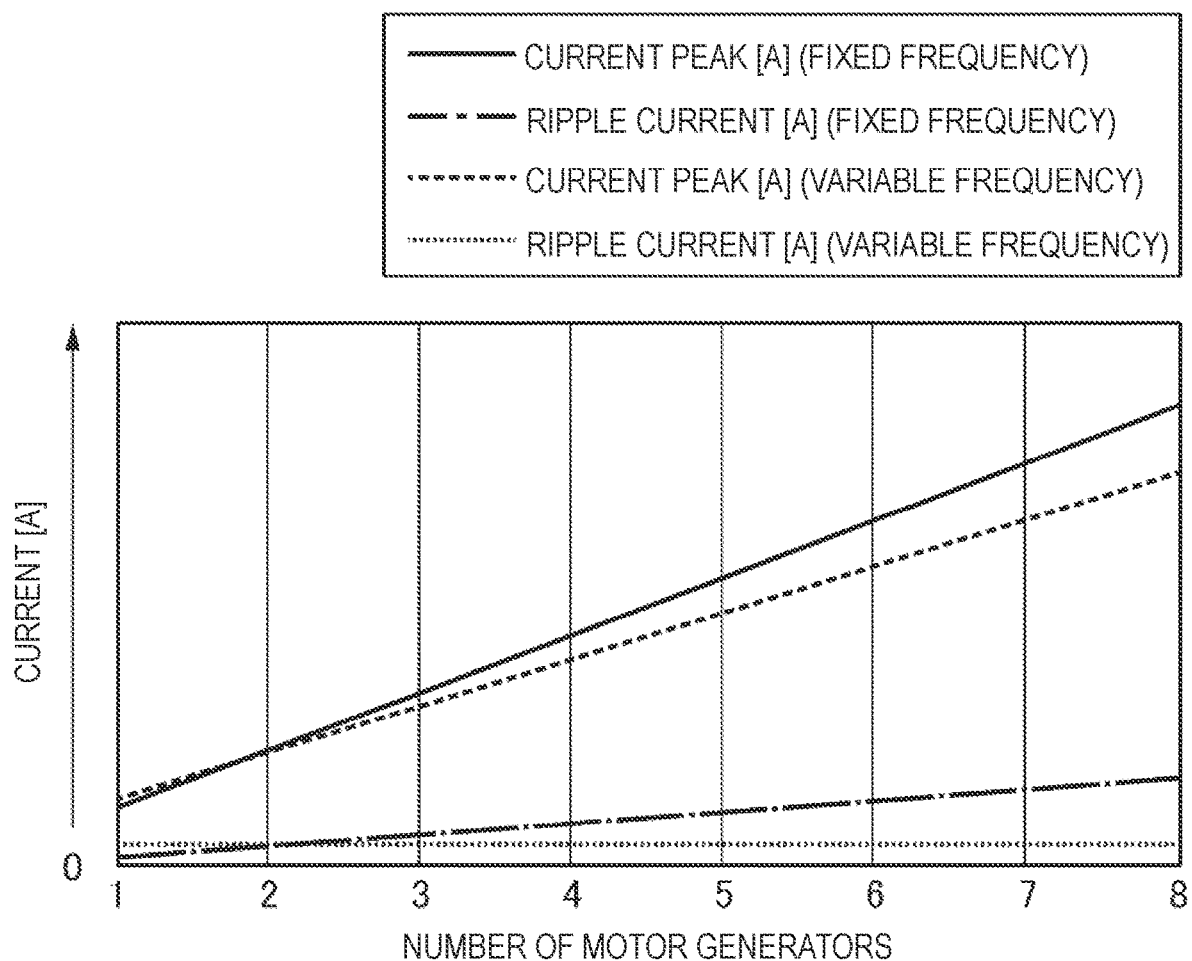
FIG. 15 is a graph illustrating a difference in current peak and ripple current when a switching cycle is constant (fixed frequency) and when the switching cycle is switched (variable frequency).

For example, assuming a situation where 1 to 8 motor generators 13 can be connected, when the voltage is constant, the time for which the current rises in one ON time is 1 to 8 times, and thus the ripple current is also 1 to 8 times. FIG. 15 is a graph illustrating a relationship between the number of motor generators 13, and the current peak and ripple current.

Figure 13:
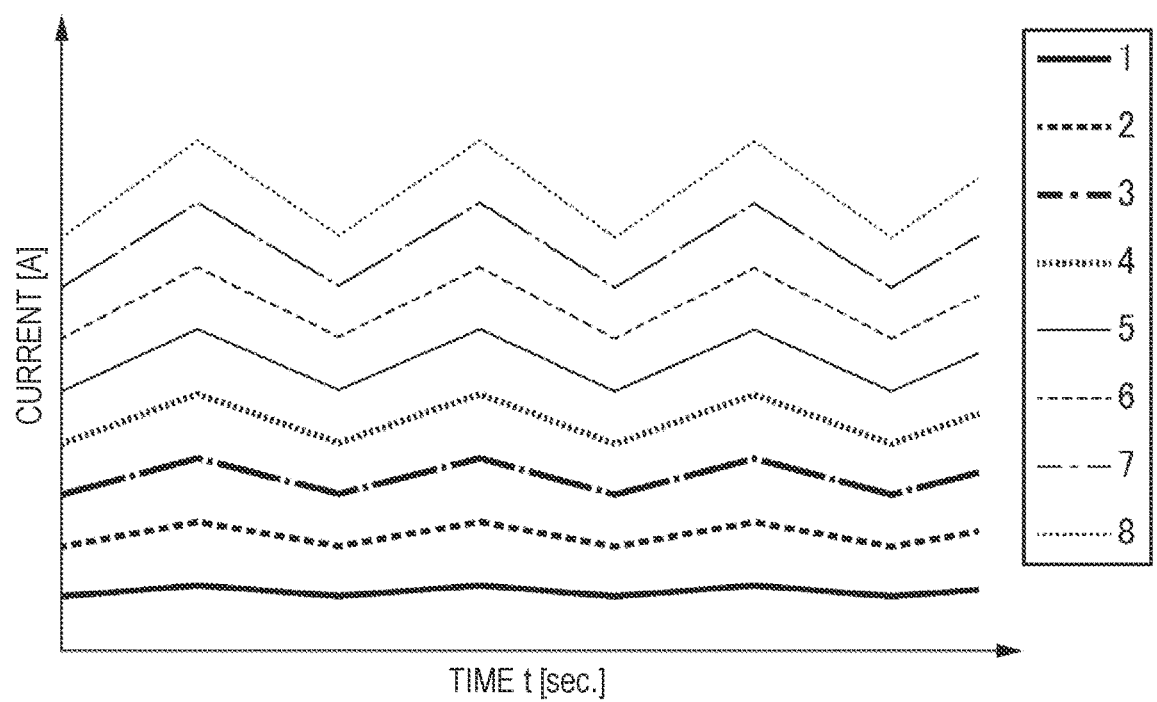
FIG. 13 is a graph illustrating a relationship between the number of motor generators and a current peak value at a predetermined frequency (fixed frequency).

Here, it is preferable that the control device 16 variably controls a switching cycle of the boost converter 17. FIG. 13 illustrates the current when the control device 16 controls the boost converter 17 at a constant switching frequency regardless of the number of motor generators 13 electrically connected in parallel to the quick charger 14. In the figure, 1 to 8 indicate the number of motor generators 13. Further, the up and down of the current value is caused by the up and down of the ripple current, and the current peak is a value when the ripple current takes a peak value. From FIG. 13, when the switching frequency is set to a constant value regardless of the number of motor generators 13, the effective current value increases as the number of motor generators 13 increases, and further, the ripple current also increases as the number of motor generators 13 increases, and thus the current peak increases.

Figure 14:
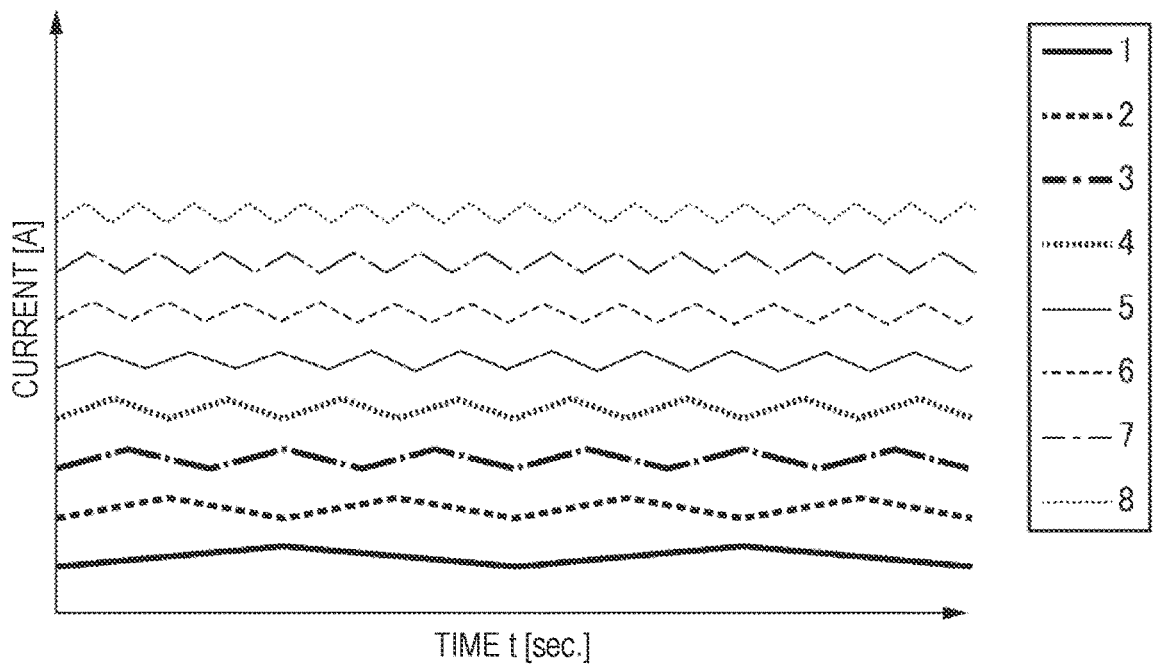
FIG. 14 is a graph illustrating a relationship between the number of motor generators and the current peak value at a frequency (variable frequency) appropriately set according to the number of motor generators.

On the other hand, FIG. 14 illustrates the current peak when the boost converter 17 is controlled in a set switching cycle by appropriately setting the switching frequency according to the number of motor generators 13 electrically connected in parallel to the quick charger 14. In an example of FIG. 14, the switching frequency is set so that the ripple current becomes a constant value regardless of the number of motor generators 13. According to this, although the effective current value increases as the number of motor generators 13 increases, the current peak becomes smaller because the ripple current is a constant value. The ripple current does not have to be a constant value and the switching frequency may be set so that the ripple current is equal to or less than a predetermined value.

In such a way, the current peak can be lowered by the control device 16 switching the switching frequency of the boost converter 17 so that the ripple current becomes equal to or less than a predetermined value according to the number of motor generators 13. As a result, it is possible to suppress the cost increase of the boost converter 17.

When the control device 16 does not know the number of motor generators 13 electrically connected in parallel to the quick charger 14 at the start of operation of the boost converter 17, the boost converter 17 can be operated in a predetermined switching cycle and the number of motor generators 13 can be acquired from a gradient of the input and output voltage and current of the boost converter 17. A relationship between the gradient of the input and output voltage and current of the boost converter 17 and the number of motor generators 13 may be measured in advance and stored as a table, or may be calculated as appropriate.

The control device 16 may acquire the number of motor generators 13 from the gradient of the input and output voltage and current of the boost converter 17 and may switch the switching frequency based on the acquired number of motor generators 13. Also, the control device 16 may switch the switching frequency directly from the gradient of the input and output voltage and current of the boost converter 17.

FIG. 15 illustrates the current peak and ripple current when the switching cycle is constant (fixed frequency) and the current peak and ripple current when the switching cycle is switched (variable frequency). As is clear from FIG. 15, the current peak of the boost converter 17 can be suppressed by switching the switching frequency based on the number of motor generators 13.

Fourth Embodiment

Next, a charging system 10 of a fourth embodiment of the present invention will be described with reference to FIG. 16.

In the charging system 10 of the first embodiment, one set of the inverter 11, the kinetic energy storage unit 15, and the quick charger 14 (hereinafter, the one set of the inverter 11, the kinetic energy storage unit 15, and the quick charger 14 may be referred to as a charging unit 18) is configured to be able to supply the energy required to charge the battery BAT for one vehicle. However, in the charging system 10 of the fourth embodiment, three sets of the charging units 18 are configured to be able to supply the energy required to charge the battery BAT for one vehicle. As a result, each of the inverter 11, the kinetic energy storage unit 15, and the quick charger 14 can be miniaturized.

Although various embodiments are described above with reference to the drawings, it goes without saying that the present invention is not limited to such examples. It is clear that a person skilled in the art can come up with various modification examples or amendment examples within the scope of the claims and it is understood that they also naturally belong to the technical scope of the present invention. Further, respective components in the embodiments described above may be freely combined as long as the gist of the present invention is not deviated.

For example, the vehicle is exemplified as a moving object, but the moving object is not limited to this and the moving object may be a flying object. Therefore, a power storage device mounted on the moving object may be a power storage device mounted on the flying object.

In addition, at least the following matters are described in the present specification. The components and the like corresponding to those of the embodiments described above are shown in parentheses, but the present invention is not limited thereto.

(1) A charging system (charging system 10) which charges a power storage device (battery BAD mounted on a moving object (vehicle V), including:
   an electric power conversion device (inverter 11) that converts electric power supplied from a commercial power supply (commercial power supply PS);
   a kinetic energy storage device (flywheel 12) that stores kinetic energy; and
   a rotary electric machine (motor generator 13) that is electrically connected to the electric power conversion device and is mechanically connected to the kinetic energy storage device.

According to (1), by storing the electric power supplied from the commercial power supply as kinetic energy in the kinetic energy storage device, it is possible to store energy appropriately in a limited space as compared with the case of storing electrical energy. As a result, the power storage device mounted on the vehicle can be efficiently charged.

(2) The charging system according to (1), where
   a voltage of the electric power supplied from the commercial power supply is 100 V or more and 300 V or less.

According to (2), the electric power supplied from the commercial power supply has a voltage of 100 V or more and 300 V or less. Therefore, no special power receiving facility such as a high-voltage power receiving facility (cubicle) is required and the site for introducing the charging system can be small. As a result, the introduction cost can be suppressed.

(3) The charging system according to (1) or (2), where
   the electric power conversion device includes a first electric power conversion unit (first inverter unit INV1) for converting a first AC power supplied from the commercial power supply into DC power and a second electric power conversion unit (second inverter unit INV2) for converting the DC power into a second AC power different from the first AC power. According to (3), a highly versatile electric power conversion device can be used.

(4) The charging system according to any one of (1) to (3), where
   the kinetic energy storage device and the rotary electric machine form a kinetic energy storage unit (kinetic energy storage unit 15),
   the charging system has a plurality of the kinetic energy storage units, and
   a plurality of the rotary electric machines are electrically connected each other, and electrically connected to the electric power conversion device in parallel.

According to (4), since a plurality of rotary electric machines are connected in parallel to the electric power conversion device, the charging system can be miniaturized as compared with the case where the electric power conversion device is connected to each of the rotary electric machines, (5) The charging system according to (4), where
   the control device (control device 16) for controlling the electric power conversion device performs phase matching control for matching rotational phases of rotors of the plurality of rotary electric machines before starting storage of kinetic energy of the kinetic energy storage device by the plurality of rotary electric machines.

According to (5), even when the plurality of rotary electric machines are connected in parallel to the electric power conversion device, the plurality of rotary electric machines can be appropriately controlled by the phase matching control.

(6) The charging system according to (5), where
   the phase matching control controls so that at least a part of a plurality of phases is energized with direct current.

According to (6), the rotor phases can be made uniform even when the rotor phases are different in the plurality of rotary electric machines.

(7) The charging system according to (6), where
   the phase matching control intermittently executes the DC energization.

According to (7), by intermittently applying torque to each phase, a gentle reaction force acts on the rotor when the torque is released, and thus the phase matching operation of the rotor is promoted.

(8) The charging, system according to (6) or (7), where
   the plurality of rotary electric machines are three-phase AC rotary electric machines, and
   when any one of three phases is zero phase, the phase matching control executes the DC energization to the remaining two phases of the three phases, According to (8), the phase matching control can be easily performed.

(9) The charging system according to any one of (4) to (8), further including:
   a boost converter (boost converter 17) that is electrically connected to the plurality of rotary electric machines in parallel and boosts electric power supplied from the plurality of rotary electric machines, where the plurality of the rotary electric machines being electrically connected each other,
   where the control device (control device 16) for controlling the electric power conversion device variably controls switching frequency of the boost converter.

According to (9), the current peak can be lowered, and thus the cost increase of the boost converter can be suppressed.

(10) The charging system according to (9), where
   the control device acquires the number of the plurality of rotary electric machines connected to the boost converter and switches the switching frequency based on the number of the plurality of rotary electric machines.

According to (10), the current peak can be lowered by switching the switching frequency according to the number of the plurality of rotary electric machines.

(11) The charging system according to (10), where
   the control device acquires the number of the plurality of rotary electric machines based on input and output voltage and current of the boost converter.

According to (11), the number of the plurality of rotary electric machines can be acquired based on the input and output voltage and current of the boost converter.

(12) The charging system according to (9), where
   the control device switches the switching frequency based on the input and output voltage and current of the boost converter.

According to (12), the current peak can be lowered by switching the switching frequency based on the input and output voltage and current of the boost converter.

(13) The charging system according to any one of (9) to (12), where the control device switches the switching frequency so that ripple current becomes a predetermined value or less according to the number of the plurality of rotary electric machines.

According to (13), since the ripple current is equal to or less than a predetermined value, the current peak and its fluctuation range can be reduced.

(14) The charging system according to any one of (1) to (13), where an auxiliary power source (solar cell 40) is electrically connected to the electric power conversion device.

According to (14), since the auxiliary power source such as a solar cell is electrically connected to the electric power conversion device, natural energy can be effectively utilized.

What is claimed is:

1. A charging system which charges a power storage device mounted on a moving object, comprising:
    an electric power conversion device that converts electric power supplied from a commercial power supply;
    a kinetic energy storage device that stores kinetic energy by power running driving the rotary electric machine which receives the electric power supplied from the commercial power supply via the electric power conversion device; and
    a rotary electric machine that is electrically connected to the electric power conversion device and is mechanically connected to the kinetic energy storage device.

2. The charging system according to claim 1, wherein a voltage of the electric power supplied from the commercial power supply is 100 V or more and 300 V or less.

3. The charging system according to claim 1, wherein the electric power conversion device includes a first electric power conversion unit for converting a first AC power supplied from the commercial power supply into DC power and a second electric power conversion unit for converting the DC power into a second AC power different from the first AC power.

4. The charging system according to claim 1, wherein the kinetic energy storage device and the rotary electric machine form a kinetic energy storage unit,
    the charging system has a plurality of the kinetic energy storage units, and
    a plurality of the rotary electric machines are electrically connected each other, and electrically connected to the electric power conversion device in parallel.

5. The charging system according to claim 4, wherein the control device for controlling the electric power conversion device performs phase matching control for matching rotational phases of rotors of the plurality of rotary electric machines before starting storage of kinetic energy of the kinetic energy storage device by the plurality of rotary electric machines.

6. The charging system according to claim 5, wherein the phase matching control controls so that at least a part of a plurality of phases is energized with direct current.

7. The charging system according to claim 6, wherein the phase matching control intermittently executes the DC energization.

8. The charging system according to claim 6, wherein the plurality of rotary electric machines are three-phase AC rotary electric machines, and
    when any one of three phases is zero phase, the phase matching control executes the DC energization to the remaining two phases of the three phases.

9. The charging system according to claim 4, further comprising:
    a boost converter that is electrically connected to the plurality of rotary electric machines in parallel and boosts electric power supplied from the plurality of rotary electric machines, where the plurality of the rotary electric machines being electrically connected each other,
    wherein the control device for controlling the electric power conversion device variably controls switching frequency of the boost converter.

10. The charging system according to claim 9, wherein the control device acquires the number of the plurality of rotary electric machines connected to the boost converter and switches the switching frequency based on the number of the plurality of rotary electric machines.

11. The charging system according to claim 10, wherein the control device acquires the number of the plurality of rotary electric machines based on input and output voltage and current of the boost converter.

12. The charging system according to claim 9, wherein the control device switches the switching frequency based on the input and output voltage and current of the boost converter.

13. The charging system according to claim 9, wherein the control device switches the switching frequency so that ripple current becomes a predetermined value or less according to the number of the plurality of rotary electric machines.

14. The charging system according to claim 1, wherein an auxiliary power source is electrically connected to the electric power conversion device.

* * * * *